United States Patent
Shimazu

[11] 3,835,584
[45] Sept. 17, 1974

[54] SYNTHETIC FORM RESIN PROPAGATION BED FOR PLANTS CUTTING

[76] Inventor: Munenari Shimazu, 4-943-20, Matsumi-cho, Kanagawa-ku, Yokohama, Japan

[22] Filed: Dec. 20, 1972

[21] Appl. No.: 316,922

[30] Foreign Application Priority Data
Jan. 7, 1972  Japan.................................. 47-5139

[52] U.S. Cl........................... 47/37, 47/1.2, 211/60, 47/41.13
[51] Int. Cl............................................. A01g 9/02
[58] Field of Search............ 47/34.13, 41.11, 41.13, 47/37, DIG. 7, 1.2; 206/46 FC

[56] References Cited
UNITED STATES PATENTS
2,691,849  10/1954  Ehlers................................ 47/41.11
3,513,593  5/1970  Beck................................... 47/34.13
FOREIGN PATENTS OR APPLICATIONS
1,947,180  3/1971  Germany Primary Examiner—Robert E. Bagwill
Attorney, Agent, or Firm—William Anthony Drucker

[57] ABSTRACT

A synthetic foam resin propagation bed for plant cuttings provided by a block of spongy synthetic resin having a longitudinal slot of a χ-shape cross section capable of receiving a plant graft therein to be water-propagated.

3 Claims, 4 Drawing Figures

SYNTHETIC FORM RESIN PROPAGATION BED FOR PLANTS CUTTING

It is an object of the present invention to provide a propagation bed for plant cuttings in which a twig of a tree of about 4.5 centimeters long is to take root and grow to a young plant.

It is another object of the present invention to provide a propagation bed in which a short stem or bud of a vegetable or flower is to take root and grow to a young plant.

In accordance with the present invention, the above objects have been accomplished by employing a cubic block of synthetic foam resin, particularly polyurethane foam. Since the material of the block is soft and hygroscopic it can store liquid manure for water-propagation. When a plant takes root the root can enter the block and stretch. The blocks may be advantageously used in propagation for ornamental purposes since the blocks are suitable for use in propagation within vessel.

The propagation bed comprises a spongy cubic body having longitudinal slot of a χ-shape cross-section formed by means of knife, a short graft of a plant can be easily inserted into a crosspoint of the slot and held upright without being broken or bent.

In the accompanying drawings.

Figure 1:
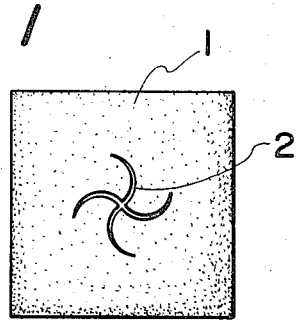
FIG. 1 is a plan view of a propagation bed in accordance with the present invention.
Figure 2:
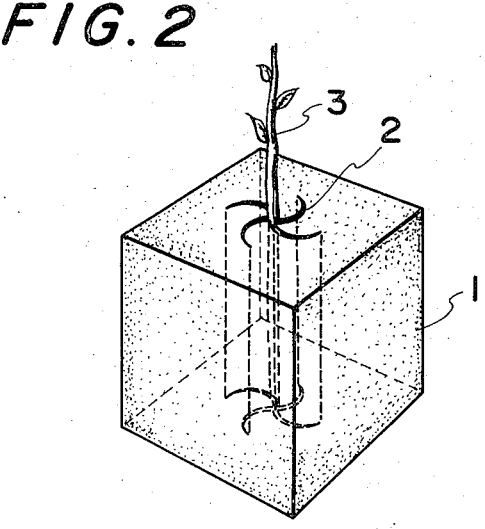
FIG. 2 is a perspective view of the propagation bed shown in FIG. 1 with a short twig being inserted into the slots.
Figure 3:
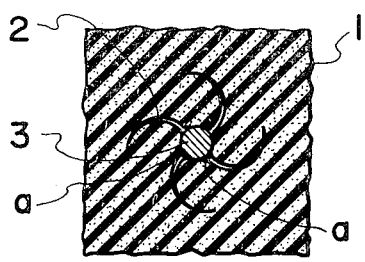
FIG. 3 shows a lateral cross-section of the assembly of FIG. 2 showing a slight spacing between a cutting and the peripheral wall of the block.
Figure 4:
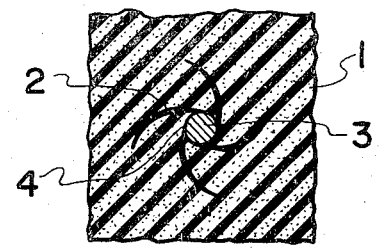
FIG. 4 is a cross section of the assembly of FIG. 3 after the plant cutting has been twisted and turned illustrating that the space between the cutting and the peripheral wall has been eliminated.

In the drawings, 1 is a propagation bed of spongy synthetic resin block, 2 is a slot of a χ-shape or tetraskelion cross-section which may either extend from a top surface of the block to a bottom surface thereof or from said top surface to an intermediate point of the block 3 is a twig or stem to be inserted into the propagation bed. 4 illustrates a condition in which insert of the twig or stem tightly contacts with the peripheral wall of the slot to provide tangential contact therewith and $a$ designates a slight spacing between the insert and said peripheral wall.

In accordance with the present invention, as shown in the drawings, the propagation bed is a cubic block made of polyurethane foam which has the χ-shaped slot 2 formed extending from the top surface to the bottom surface of the block. The propagation bed of this type can be simply manufactured at cheaper cost in mass production. The slot can be formed by a suitable machine.

The slot may terminate at an intermediate point of the block for cutting purpose. When the graft of a plant is inserted into the crosspoint of the slot, there exists a slight spacing $a$ between the insert 3 and the peripheral wall. In order to eliminate the graft spacing the insert should be twisted so that the insert is brought into intimate contact with the peripheral wall to assume a tangential contact position 4. Thus the graft insert is tightly supported and does not fall down facilitating the extending of the root to stretch.

An important feature of the present invention is the slot which permits the easy turning of the insert when the latter is to be twisted. Furthermore with such arrangement, the peripheral wall made of soft polyurethane foam entwines around the insert to tightly hold the insert by the peripheral wall.

The present invention simplifies the work of cutting and a young plant can be grown for each block. After the plant has grown with liquid manure contained in the propagation bed in case of liquid-propagation, and the root has extended into the block, the plant together with the propagation bed can be transplanted to garden or field. Thus the transplantation work is facilitated because no soil is involved. A small young plant such as a flower plant can be housed in a vessel together with the propagation bed for use in in-door ornamentation. The χ-type notch 2 holds the cutting upright in a superior manner to a +-type notch.

The soft arms may extend in a clockwise or counterclockwise direction and the number of arms is preferably four but a larger number may be used.

What is claimed is:

1. A propagation bed for plants comprising a block of soft, hygroscopic, foamed synthetic resin, with a tetraskelion-shaped slot extending from a surface of said block interiorly thereof a predetermined distance sufficient to receive and retain plant material placed therein, the arms of said slot being generally equally spaced from each other, and crescent-shaped in outline.

2. A propagation bed as in claim 1, wherein said block is a cube and said resin is polyurethane, with said slot extending entirely through said block.

3. A propagation bed as in claim 1, further including at least one additional arm, said slot being at least pentaskelion-shaped.

* * * * *